United States Patent [19]
Aoyama et al.

[11] Patent Number: 5,586,018
[45] Date of Patent: Dec. 17, 1996

[54] DEVICE FOR SUPPRESSING VOLTAGE FLUCTUATION AND HIGHER HARMONICS

[75] Inventors: Fumio Aoyama, Saitama-ken; Yoshirou Tanoue, Tokyo, both of Japan

[73] Assignee: Kabushiki Kaisha Toshiba, Kawasaki, Japan

[21] Appl. No.: 535,348

[22] Filed: Sep. 28, 1995

Related U.S. Application Data

[63] Continuation of Ser. No. 190,898, Feb. 3, 1994, abandoned.

[30] Foreign Application Priority Data

Feb. 4, 1993 [JP] Japan ................................. 5-017307

[51] Int. Cl.⁶ ............................................. H02M 5/257
[52] U.S. Cl. .............................. 363/41; 363/79; 323/207
[58] Field of Search .................................... 323/205, 207, 323/210; 363/39, 79, 41

[56] References Cited

U.S. PATENT DOCUMENTS

| | | | |
|---|---|---|---|
| 4,752,726 | 6/1988 | Aoyama | 323/207 |
| 4,812,669 | 3/1989 | Takeda et al. | 363/98 |
| 5,077,517 | 12/1991 | Tanoue et al. | 323/307 |
| 5,349,522 | 9/1994 | Konishi et al. | 363/95 |
| 5,738,247 | 8/1992 | Tanoue et al. | 323/207 |

FOREIGN PATENT DOCUMENTS

| | | |
|---|---|---|
| 0431967 | 6/1991 | European Pat. Off. . |
| 0476618 | 3/1992 | European Pat. Off. . |
| 3-183324 | 8/1991 | Japan . |

OTHER PUBLICATIONS

The Transactions of The Institute of Electrical Engineers of Japan, vol. 103–B, No. 7, pp. 483–490, "Generalized Theory of the Instantaneous Reactive Power and its Applications," H. Akagi, et al., Jul. 1983.

*Primary Examiner*—Peter S. Wong
*Assistant Examiner*—Shawn Riley
*Attorney, Agent, or Firm*—Oblon, Spivak, McClelland, Maier & Neustadt, P.C.

[57] ABSTRACT

A device for suppressing voltage fluctuation and higher harmonics of a power source system which supplies power to a load with large power fluctuation and large harmonic current. The device includes a self-commutated converter arranged in parallel with the load and a control circuit for controlling the self-commutated converter. The control circuit includes a compensation current variable calculation circuit for calculating a plurality of compensation current variables based on electrical quantities of the power source system and the load, a compensation gain calculation circuit for determining at least one compensation gain based on at least one of the compensation current variable, and a current instruction value calculation circuit for calculating a plurality of respective current instruction values based on the compensation gain and a plurality of the respective current compensation variables. The control circuit also includes an overall current instruction value calculation circuit for calculating an overall current instruction value by combining the current instruction values, and a current control circuit for controlling an output current of the self-commutated converter based on the overall current instruction value.

6 Claims, 11 Drawing Sheets

DEVICE FOR SUPPRESSING VOLTAGE FLUCTUATION AND HIGHER HARMONICS

This application is a Continuation of application Ser. No. 08/190,898, filed on Feb. 3, 1994, now abandoned.

BACKGROUND OF THE INVENTION

1. Field of the Invention

This invention relates to a device for suppressing voltage fluctuation and higher harmonics. And more particularly, in a system wherein power is supplied from a power source system to a load of large power fluctuation and harmonic current, this invention relates to a device for suppressing voltage fluctuation and higher harmonics, that suppresses the voltage fluctuation and higher harmonics of the power source system that are created by the power fluctuation of the load.

2. Description of the Related Art

Conventionally, in order to suppress the voltage fluctuations and higher harmonics of a power source system that are created by a load, such as an arc furnace, of irregular power fluctuation and large capacity, and that generates irregular higher harmonics, it has been the practice to arrange in parallel with the load a device for compensating the reactive power, negative phase sequence current and harmonic current of the load. An example is described in the specification of Japanese patent disclosure No. H3-183324 and U.S. Pat. No. 5,077,517.

Figure 4:
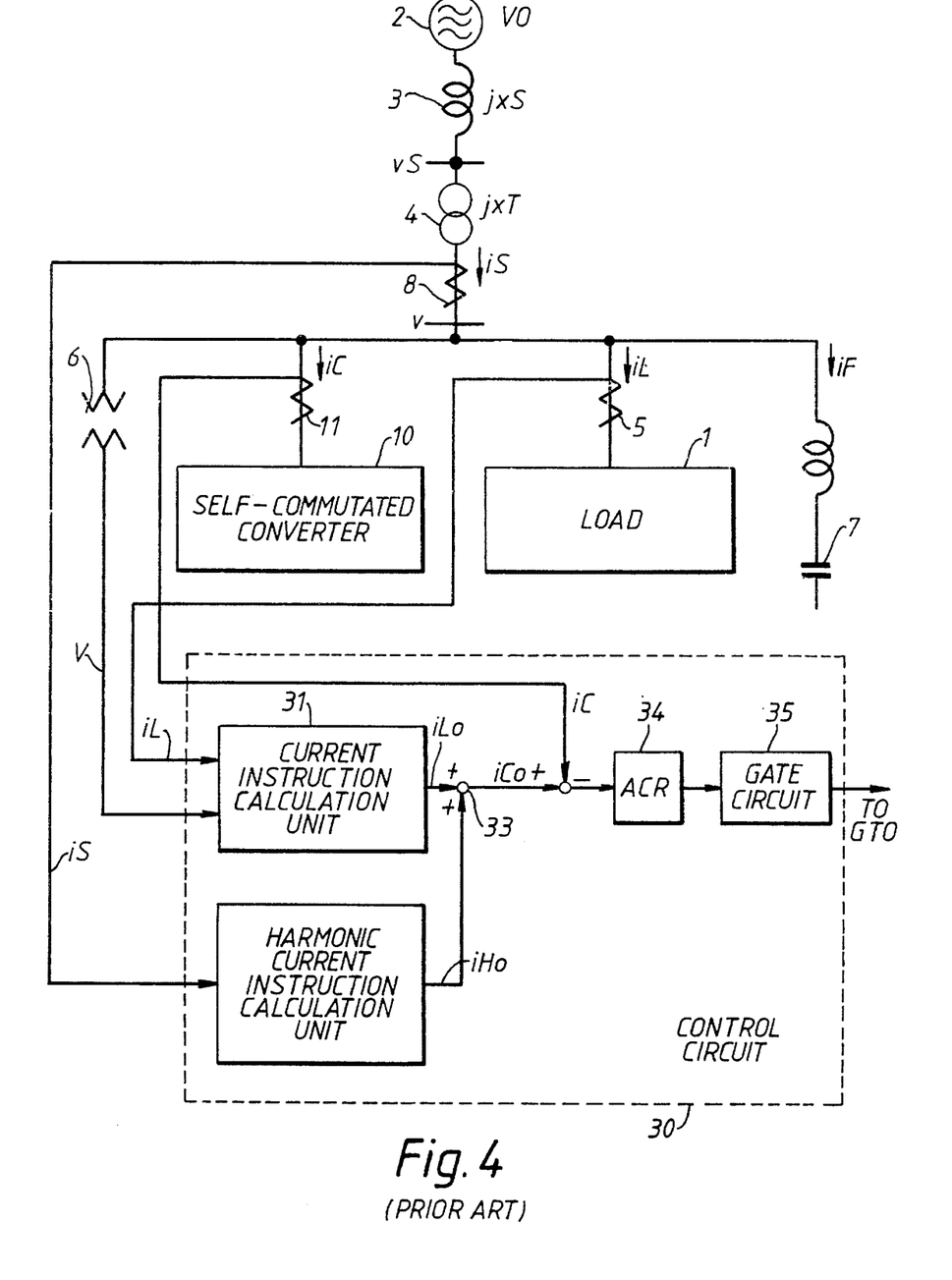
FIG. 4 is a circuit diagram showing the diagrammatic layout of a prior art voltage fluctuation and higher harmonics suppression device.

FIG. 4 shows a diagrammatic circuit layout of such a conventional device for suppressing voltage fluctuation and higher harmonics. To avoid complexity, the three-phase system is shown as a single-line connection diagram.

Figure 5:
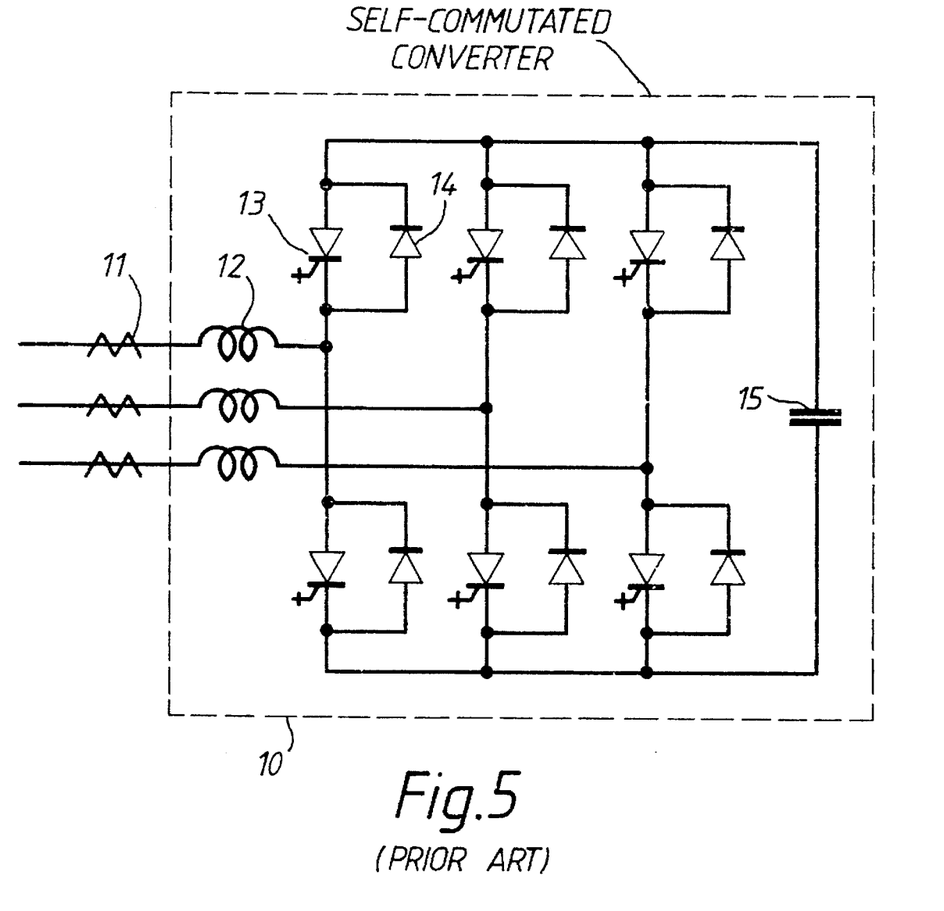
FIG. 5 is a circuit diagram showing a self-commutated converter in the voltage fluctuation and higher harmonics suppression device of FIG. 4.

In FIG. 4, power is supplied to a load 1 from an AC power source 2 through a transmission line 3 (let its impedance be jXS) and a receiving transformer 4 (let its impedance be jXT). A voltage fluctuation and higher harmonics suppression device constituted by a self-commutated converter 10 is arranged in parallel with load 1 and is controlled by a control circuit 30. A harmonic filter 7 is provided with the object of suppressing the higher harmonics generated by load 1 and improving the power factor. Self-commutated converter 10 is constructed, as shown in FIG. 5, by AC reactors 12, gate turn-off thyristors (GTO) 13, diodes 14, and a DC capacitor 15.

Control circuit 30 is constituted as follows. Specifically, it is equipped with: a current instruction calculation unit 31 that inputs a load current iL detected by a current transformer 5 and a system voltage V detected by a voltage detection transformer 6 and that finds a current instruction value iLo for suppressing voltage fluctuation; a harmonic current instruction calculation unit 32 that inputs a system current iS flowing in the power source system and detected by a current transformer 8 and that finds a harmonic current instruction value iHo for suppressing the higher harmonics emitted to the power source system; and an adder circuit 33 that adds current instruction values iLo and iHo. Current iC is controlled through an automatic current signal regulator (ACR) 34 and a gate circuit 35, in response to the deviation between a current iC flowing in self-commutated converter 10 detected by a current transformer 11 and a current instruction value iCo of self-commutated converter 10 arrived at by the addition process performed by this adder circuit 33.

Here, current instruction value iLo is a signal for compensating the load reactive power, but if required, a signal for compensating the negative phase sequence current of load 1 could be added.

Next, a specific example of the conventional voltage fluctuation and higher harmonics suppression device shown in FIG. 4 will be described with reference to FIG. 6. In this example, current instruction calculation unit 31 outputs a signal for compensating the negative phase sequence current of load 1 in addition to a signal for compensating the load reative power. Parts which are the same as in FIG. 4 are given the same reference numerals and a description of them is omitted.

The load current iL of load 1 detected by current transformer 5 is the line current of the three-phase circuit. A three-phase/two-phase converter circuit 31A converts this three-phase AC current to two-phase AC current. This conversion is expressed by equation (1), where iR, iS and iT are the respective line currents of three-phase AC current iL and id and iq are the two-phase AC currents.

$$\begin{pmatrix} id \\ iq \end{pmatrix} = \sqrt{2/3} \begin{pmatrix} 1 & -1/2 & -1/2 \\ 0 & \sqrt{3/2} & -\sqrt{3/2} \end{pmatrix} \begin{pmatrix} iR \\ iS \\ iT \end{pmatrix} \quad (1)$$

In the case of the circuit voltage, the respective phase voltages VR, VS and VT of three-phase AC voltage V detected by voltage detection transformer 6 are converted to two-phase AC voltages vd and vq by three-phase/two-phase converter circuit 31B. This conversion is expressed by equation (2) which is equivalent to that of equation (1), substituting current i by voltage v.

$$\begin{pmatrix} vd \\ vq \end{pmatrix} = \sqrt{2/3} \begin{pmatrix} 1 & -1/2 & -1/2 \\ 0 & \sqrt{3/2} & -\sqrt{3/2} \end{pmatrix} \begin{pmatrix} VR \\ VS \\ VT \end{pmatrix} \quad (2)$$

Synchronization detection circuit 31C converts two-phase voltage signals vd, vq obtained by the two-phase conversion to synchronous voltage signals vdo, vqo, synchronized with the fundamental wave component. Reactive power detection circuit 31D respectively inputs synchronized voltage signals vdo, vqo and two-phase AC currents id, iq, and detects instantaneous real power p and instantaneous imaginary power q. That is, reative power detection circuit 31D detects so-called instantaneous real power p and instantaneous imaginary power q as defined in "Journal of the Institute of Electrical Engineers of Japan, Article No. 58-B60, P41 to 48 "Theory of Generalization of Instantaneous Reactive Power and Its Applications". These are found by the calculation of equation (3).

$$\begin{pmatrix} p \\ q \end{pmatrix} = \begin{pmatrix} id & iq \\ iq & -id \end{pmatrix} \begin{pmatrix} vdo \\ vqo \end{pmatrix} \quad (3)$$

Also, synchronous voltage signals vdo, vqo, in the two-phase AC, are orthogonal components of magnitude 1pu; vd and vdo may be considered as practically equal, and vq and vqo may be considered as practically equal. Consequently, p also means the instantaneous active power supplied to load 1 from AC power source 2, while q also means the instantaneous reactive power circulating between the two phases. In this embodiment, only instantaneous reactive power q is used for calculating current instruction value iQo.

Instantaneous imaginary power (instantaneous reactive power) q is input to a filter 31E, which filters it, and a load reactive power QL is thereby found. A reative power instruction value QLo is found by multiplying load reactive power QL by a compensation gain KQ (fixed value), by a coefficient circuit 31F. This is then further converted to a current instruction value iQo By supplying it to an instantaneous current calculation circuit 31G. The calculation of current instruction value iQo is performed by inverse conversion of equation (3) and equation (1). Specifically, if we assume that an instantaneous real power instruction value is po and an instantaneous imaginary current instruction value is qo, current instruction values ido and iqo in the two-phase AC current and current instruction values iRo, iSo and iTo in each line of the three-phase AC current are given by equations (4) and (5).

$$\begin{pmatrix} ido \\ iqo \end{pmatrix} = \begin{pmatrix} vdo & -vqo \\ -vqo & vdo \end{pmatrix} \begin{pmatrix} po \\ qo \end{pmatrix} \quad (4)$$

$$\begin{pmatrix} iRo \\ iSo \\ iTo \end{pmatrix} = \sqrt{2/3} \begin{pmatrix} 1 & 0 \\ -1/2 & \sqrt{2/3} \\ -1/2 & -\sqrt{2/3} \end{pmatrix} \begin{pmatrix} ido \\ iqo \end{pmatrix} \quad (5)$$

Where, in the calculation of current instruction value iQo for the reactive power, po=o and qo=QL are substituted in equation (4).

Also, three-phase AC load current iL detected by current transformer 5 is converted to two-phase AC currents id and iq by performing the calculation of equation (1) in a three-phase/two-phase conversion circuit 31H. Two-phase AC currents id and iq are then input to a negative phase sequence power detection circuit 31J, where negative phase sequence power is detected. In this case, the calculation is performed after inverting vqo (multiplied by −1), in the calculation of the instantaneous real power and instantaneous imaginary power using equation (3).

The (−vqo) used in this calculation is obtained by inverting the polarity of output vqo of synchronous detection circuit 31C using an inverting circuit 31K. In the output of negative phase sequence power detection circuit 31J, the fundamental wave positive phase sequence power is detected as the AC power of the doubled frequency of the fundamental wave frequency, and the fundamental wave negative phase sequence power is detected as DC power, so the fundamental wave negative phase sequence powers pN and qN can be obtained by filtering the outputs of negative phase sequence power detection circuit 31J by filters 31L and 31M. Negative phase sequence power instruction values pNo, qNo are found by multiplying fundamental wave negative phase sequence powers pN, qN by a compensating gain KN (fixed value) using coefficient circuits 31N, 31P respectively. There are then input to an instantaneous current calculation circuit 31Q, where they are converted to negative phase sequence current instruction value iNo. This calculation is performed using equation (4) and equation (5), but just as described above, this is performed after multiplying vqo by −1.

A harmonic current instruction calculation unit 32 comprises a filter 32A and a coefficient circuit 32B. Current iS of the power source system detected by current transformer 8 is input to filter 32A which thereby detects a harmonic current iH. This is input to coefficient circuit 32B and multiplied by compensation gain KH (fixed value) to obtain a harmonic current instruction value iHo.

Just to make sure, harmonic current instruction calculation unit 32 is constructed with three R,S,T units corresponding to three-phase (R,S,T) components of system current iS. And, harmonic current instruction value iHo also includes three-phase (R,S,T) components.

Reactive power current instruction value iQo, negative phase sequence current instruction value iNo and harmonic current instruction value iHo found as above are combined by adder circuit 33 to obtain current instruction value iCo for self-commutated converter 10. If explained in detail, three-phase (R,S,T) components of instruction values iQo, iNo and iHo are added to obtain three-phase (R,S,T) components of instruction value iCo, respectively.

Output current iC of self-commutated converter 10 is made to track current instruction value iCo by current control performed by automatic current signal regulator 34 using the deviation between output current iC detected by current transformer 11 and current instruction value iCo found as above. The output of automatic current signal regulator 34 is input to gate circuit 35 which generates ON/OFF pulses for PWM control of self-commutated converter 10. ON/OFF pulses are then supplied to respective gates of GTOs 13 of self-commutated converter 10 shown in FIG. 5.

Figure 7A:
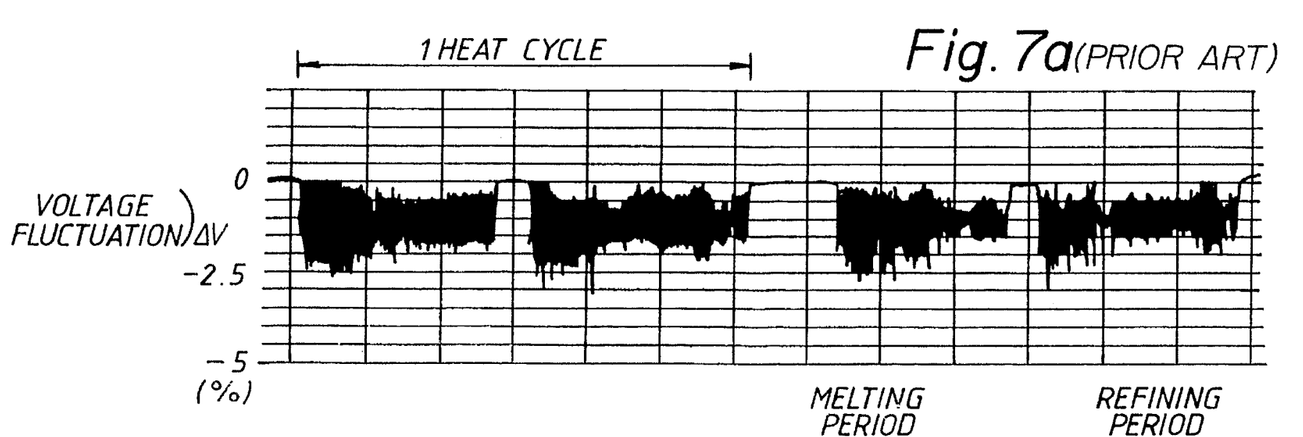
FIGS. 7a and 7b are views showing an example of the load fluctuation and its system voltage fluctuation in FIG. 4.
Figure 7B:
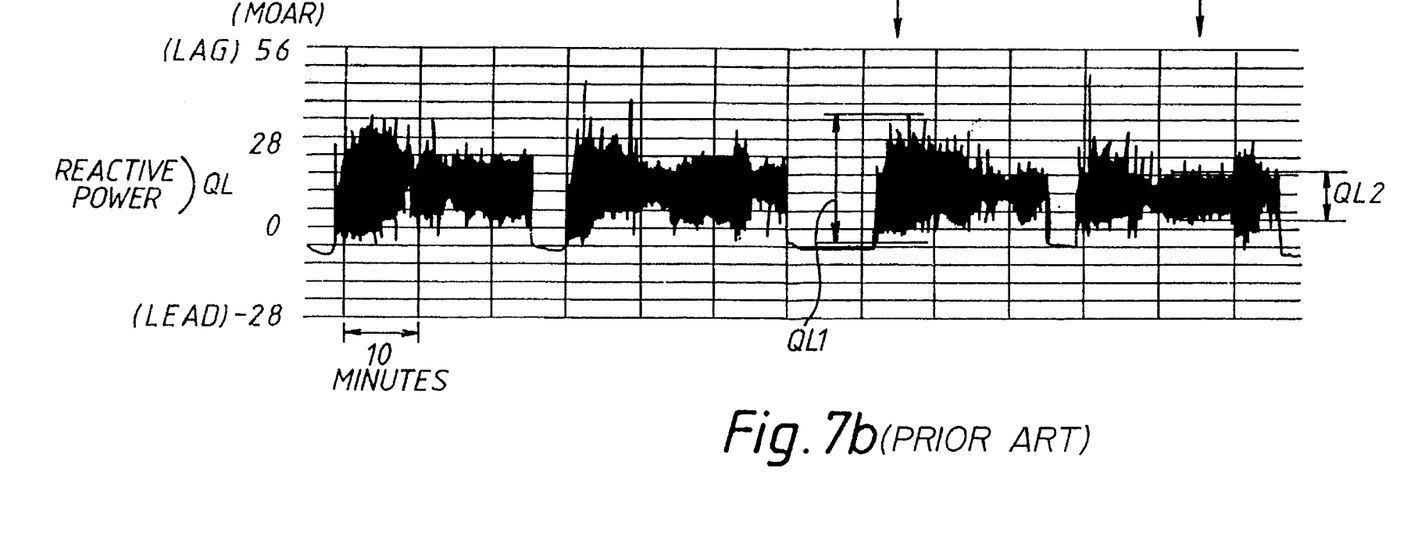

A steel-making arc furnace is an example of a load 1 to be compensated by the voltage fluctuation and higher harmonics suppression device described above. In such an arc furnace, reactive power, negative phase sequence current and harmonic current change irregularly with time, and their magnitudes are respectively very different depending on the condition of the material in the furnace. FIG. 7 shows an example of a fluctuation of reactive power QL of an arc furnace (including leading-phase capacity), and a voltage fluctuation ΔV of the system. From this Figure, it can be seen that the range of fluctuation of the reative power is different at the commencement of melting of the material (scrap) (melting period) and after melting of the material has been fully completed (refining period). The range of fluctuation of the reactive power in the refining period, shown as QL2 in the Figure is less than one half that in the melting period, shown as QL1 in the Figure, and the range of fluctuation of the voltage is proportional to this. Though not shown in the Figure, it is found that there is the same tendency to the above regarding the negative phase sequence current and harmonic current also.

As described above, in the conventional voltage fluctuation and higher harmonics suppression device, compensation gains KQ, KN and KH used in finding respective current instruction values iQo, iNo and iHo are fixed. In order to totally compensate the reactive power, negative phase sequence current and harmonic current resulting from load fluctuation, it is necessary to take all the compensation gains as being 1, and to determine the capacity of the suppression device with reference to the amount of fluctuation in the melting period.

As a result, this capacity is determined to be fairly large. However, since the range of fluctuation in the refining period is small, there is no possibility that output of the suppression device reaches the rated capacity. If this is considered over the period of one heat cycle, although the rated capacity is fully utilized in the melting period (about one-third of the heat cycle), in the remaining period i.e. the refining period, only about one-half of the rated capacity is utilized, which is uneconomic.

Also, in general, there are no cases where both the voltage fluctuation and the higher harmonics are totally suppressed. Usually, the capacity of the suppression device of voltage fluctuation and higher harmonics is determined such as to limit these within two certain limiting values. In this case, the capacity of the voltage fluctuation and higher harmonics suppression device is smaller than the maximum amount of fluctuation such as of the reactive power in the melting period. If now we provisionally assume that the capacity of the suppression device is made one-half of the maximum amount of fluctuation of the reactive power, there is the problem that, when compensation gain KQ is 1, the current instruction value of the suppression device in the melting period will exceed the rated value. In practice, since the output of the suppression device is limited to the rated value, the suppressing effect on voltage fluctuation is adversely affected. In order to avoid this, compensation gain KQ must be made smaller than 1 (e.g. 0.5). In this case, there is the problem that, as described above, the utilization rate of the suppression device in the refining period is poor.

Although the above problems relate to the reactive power, the same could be said regarding the negative phase sequence current and harmonic current.

Also, there was the problem that, in the case where voltage fluctuation and higher harmonics are simultaneously suppressed, if the suppression device does not have the capacity to fully compensate all of the reactive power, negative phase sequence current and harmonic current, in the prior art, since, the respective compensation gains are fixed, when one or other of these components increases and reaches the rated capacity, the other components cannot be compensated.

SUMMARY OF THE INVENTION

Accordingly, one object of this invention is to provide a device for suppressing voltage fluctuation and higher harmonics that is capable of effectively utilizing the device capacity to the maximum extent irrespective of the magnitude of load fluctuation, thereby improving economy, and that is capable of improving the suppression effect of voltage fluctuation and higher harmonics.

These and other objects of this invention can be achieved by providing a device for suppressing voltage fluctuation and higher harmonics of a power source system which supplies power to a load with large power fluctuation and large harmonic current. The device includes a self-commutated converter arranged in parallel with the load and a control circuit for controlling the self-commutated converter. The control circuit includes a compensation current variable calculation circuit for calculating a plurality of compensation current variables based on electrical quantities of the power source system and the load, a compensation gain calculation circuit for determining at least one compensation gain based on at least one of the compensation current variable, and a current instruction value calculation circuit for calculating a plurality of respective current instruction values based on the compensation gain and a plurality of the respective current compensation variables. The control circuit also includes an overall current instruction value calculation circuit for calculating an overall current instruction value by combining the current instruction values, and a current control circuit for controlling an output current of the self-commutated converter based on the overall current instruction value.

According to one aspect of this invention, there is provided a device for suppressing voltage fluctuation and higher harmonics of a power source system which supplies power to a load with large power fluctuation and large harmonic current. The device is constructed as described above. The device further includes an overall compensation gain calculation circuit for determining an overall compensation gain based on the overall current instruction value, and a final current instruction value calculation circuit for calculating a final current instruction value by multiplying the overall current instruction value and the overall compensation gain. The overall compensation gain is determined such that the final current instruction value does not exceed a rated current value of the self-commutated converter. The current control circuit controls the output current of the self-commutated converter based on the final current instruction value in place of the overall current instruction value.

These and other objects of this invention can be further achieved by providing a device for suppressing voltage fluctuation and higher harmonics of a power source system which supplies power to a load with large power fluctuation and large harmonic current. The device includes a self-commutated converter arranged in parallel with the load, and a control circuit for controlling the self-commutated converter. The control circuit includes a compensation current variable calculation circuit for calculating a plurality of compensation current variables based on electrical quantities of the power source system and the load, a current instruction value calculation circuit for calculating a plurality of respective current instruction values based on a plurality of the respective compensation current variables, an overall current instruction value calculation circuit for calculating an overall current instruction value by combining the plurality of current instruction values. The control circuit further includes an overall compensation gain calculation circuit for determining an overall compensation gain based on the overall current instruction value, a final current instruction value calculation circuit for calculating a final current instruction value by multiplying the overall current instruction value and the overall compensation gain, and a current control circuit for controlling an output current of the self-commutated converter based on the final current instruction value. The overall compensation gain is determined such that said final current instruction value does not exceed a rated current value of the self-commutated converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

First of all, the diagrammatic layout of this invention is described with reference to FIG. 1. Parts which are the same as parts in FIGS. 4 and 6 are given the same reference numerals and further description is omitted.

According to this invention, in a system that supplies power to load 1 of large power fluctuation and harmonic current from a power source system, there are provided: self-commutated converter 10 arranged in parallel with load 1 and a control circuit 20 for self-commutated converter 10. Control circuit 20 is composed of: a plurality of compensation current detection means (in the Figure, as an example, three compensation current variable detection means 21A to 21C); gain determining means (1) 22 that determines respective compensation gains K1, K2, K3 for detected outputs which are compensation current variables i1, i2, i3 in accordance with the magnitudes of their outputs i1, i2, i3; instruction value calculation means (23A, 23B, 23C in FIG. 1) that calculate respective current instruction values i1o, i2o, i3o from compensation current variables i1, i2, i3 and compensation gains K1, K2, K3 corresponding thereto; an adder circuit 24 that adds current instruction values i1o, i2o, i3o; Gain determining means (2) 25 that determines compensation gain KC in accordance with the magnitude of output of adder circuit 24 i.e. overall current instruction value iCo; instruction value correction means 26 that corrects overall current instruction value iCo from overall current instruction value iCo and compensation gain KC; and means 34, 35 that suppress the output current of self-commutated converter 10 in accordance with the deviation between a final current instruction value iCoe that is the output of means 26 and current iC.

Also, in the above, a construction could be adopted wherein correction means 26 of the overall current instruction value and means 25 that determines its compensation gain are omitted.

Also, the compensation gain of compensation gain determining means 22 could be determined with reference to a specified compensation current component, for example compensation current variable i1, or could be determined with reference to two specified compensation current components, for example compensation current variables i1 and i2.

Moreover, in a specific case, a construction could be adopted wherein correction means 26 of the overall current instruction value and means 25 are provided and wherein gain determining means (1) 22 is omitted and instruction value calculation means 23A, 23B and 23C calculates respective current instruction values i1o, i2o and i3o based on fixed compensation gains, respectively.

Figure 1A:
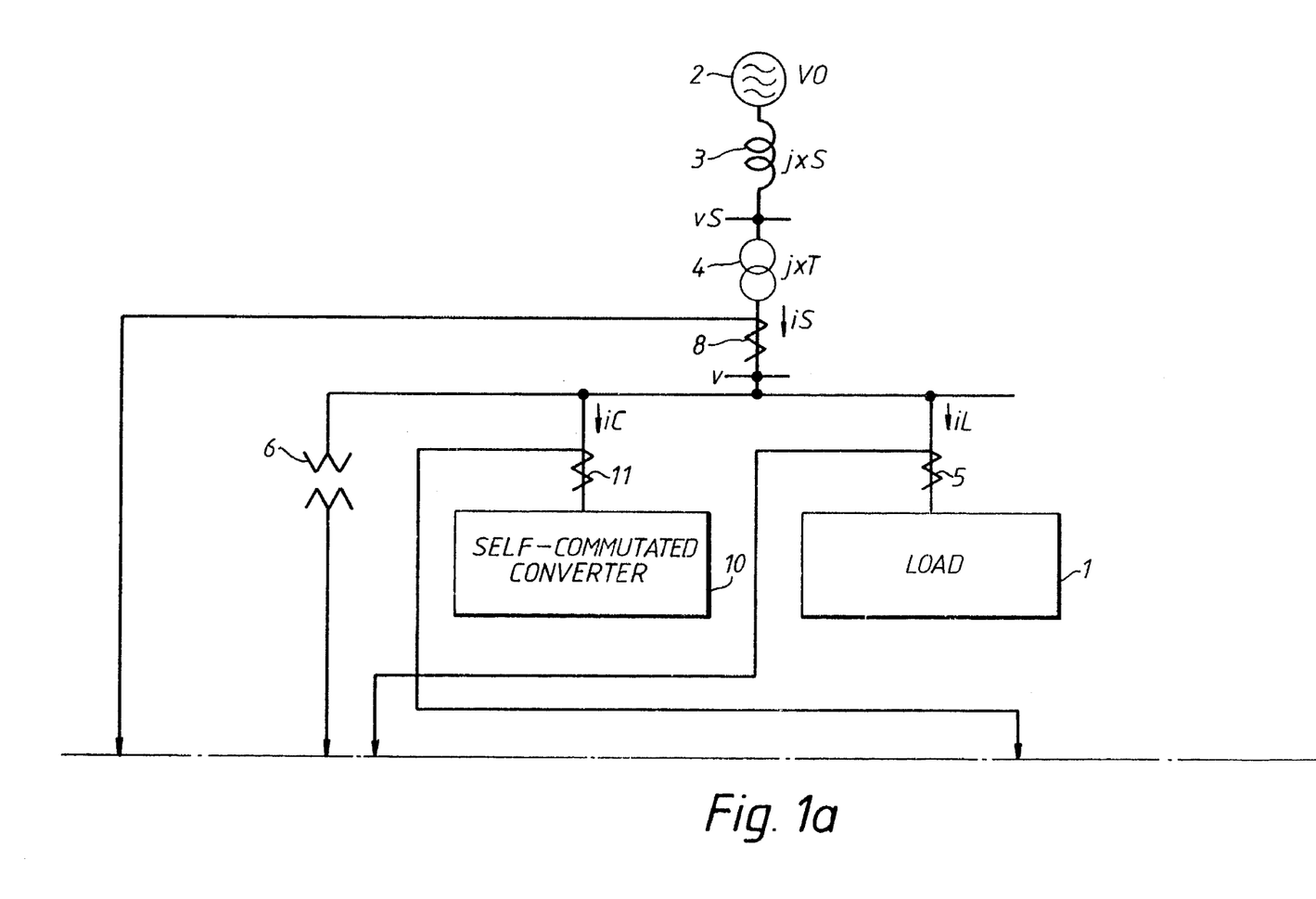
FIGS. 1a and 1b are circuit diagrams showing the diagrammatic layout of a voltage fluctuation and higher harmonics suppression device according to an embodiment of this invention.
Figure 1B:
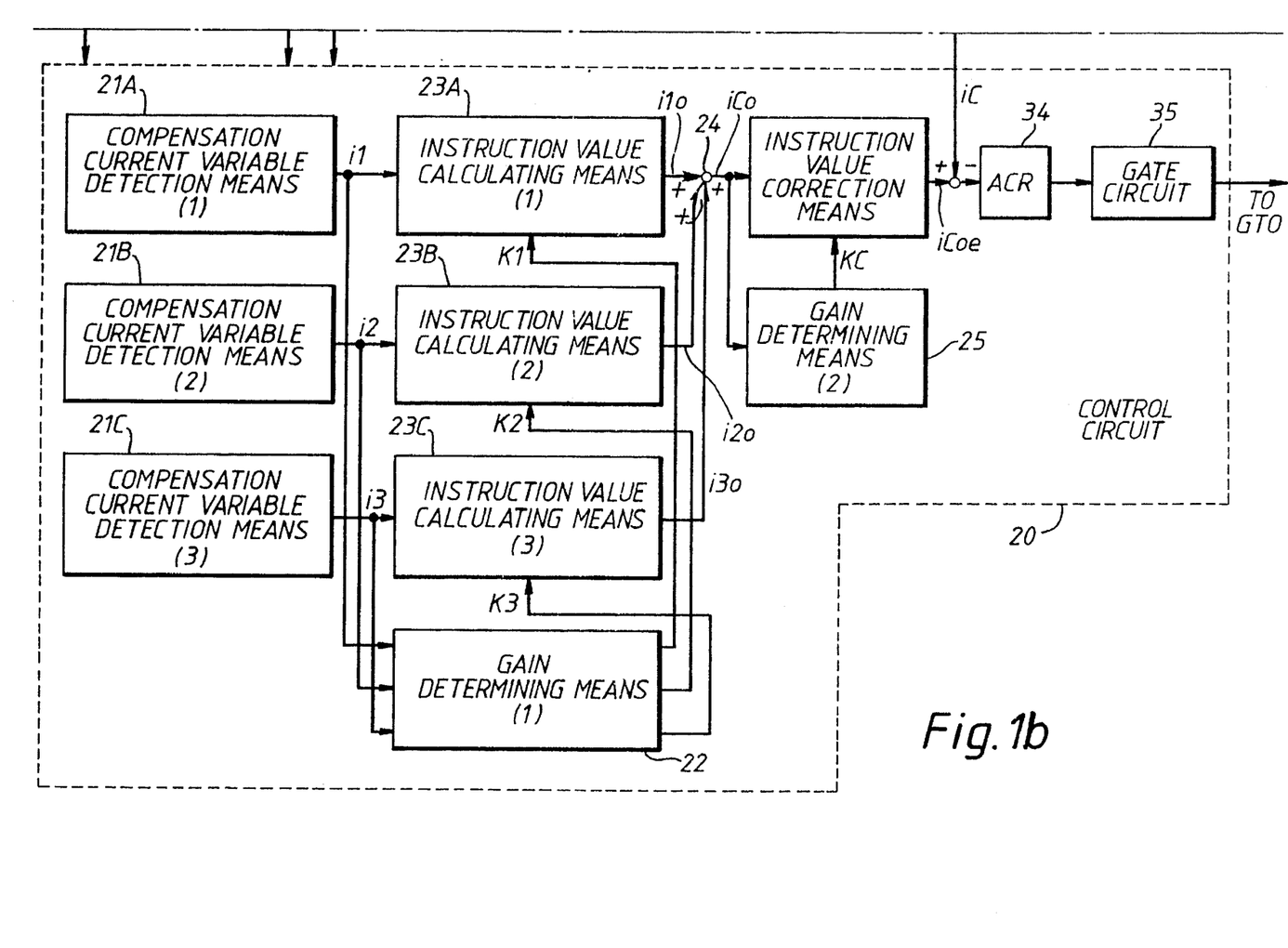

In the layout of FIG. 1, a plurality of compensation current detection means 21A, 21B, 21C calculate respective compensation current variables i1, i2 and i3 using the electrical quantities of the power source system and load 1 (e.g. system voltage V, system current iS, and load current iL). Gain determining means (1) 22 determines respective compensation gains K1, K2, K3 in accordance with the magnitude of compensation current variables i1, i2 and i3 such that none of the current instruction values i1o, i2o, i3o of the respective components gets too large.

Instruction value calculation means 23A, 23B, 23C calculate respective current instruction values i1o, i2o, i3o by multiplying respective compensation current variables i1, i2, i3 by compensation gains K1, K2, K3. These are then combined by adder circuit 24 to calculate overall current instruction value iCo. Gain determining means (2) 25 determines overall compensation gain KC in accordance with the magnitude of overall current instruction value iCo such that overall current instruction value iCo of self-commutated converter 10 does not exceed its rated value. Instruction value compensation means 26 calculates final current instruction value iCoe by multiplying overall current instruction value iCo by overall compensation gain KC. Automatic current signal regulator (ACR) 34 controls gate circuit 35 such that output current iC of self-commutated converter 10 detected by current transformer 11 and final current instruction value iCoe coincide.

As compensation current variables i1, i2 and i3, current itself may be used in some case. But usually, as a compensation current variable for reative power component, a reactive power (QL) of load 1 is used. As a compensation current variable for negative phase sequence current component, an instantaneous real power pN and an instantaneous imaginary power qN of a fundamental wave negative phase sequence power are used.

As a compensation current variable for harmonic current component, a harmonic current iH of the power source system is usually used.

Figure 2A:
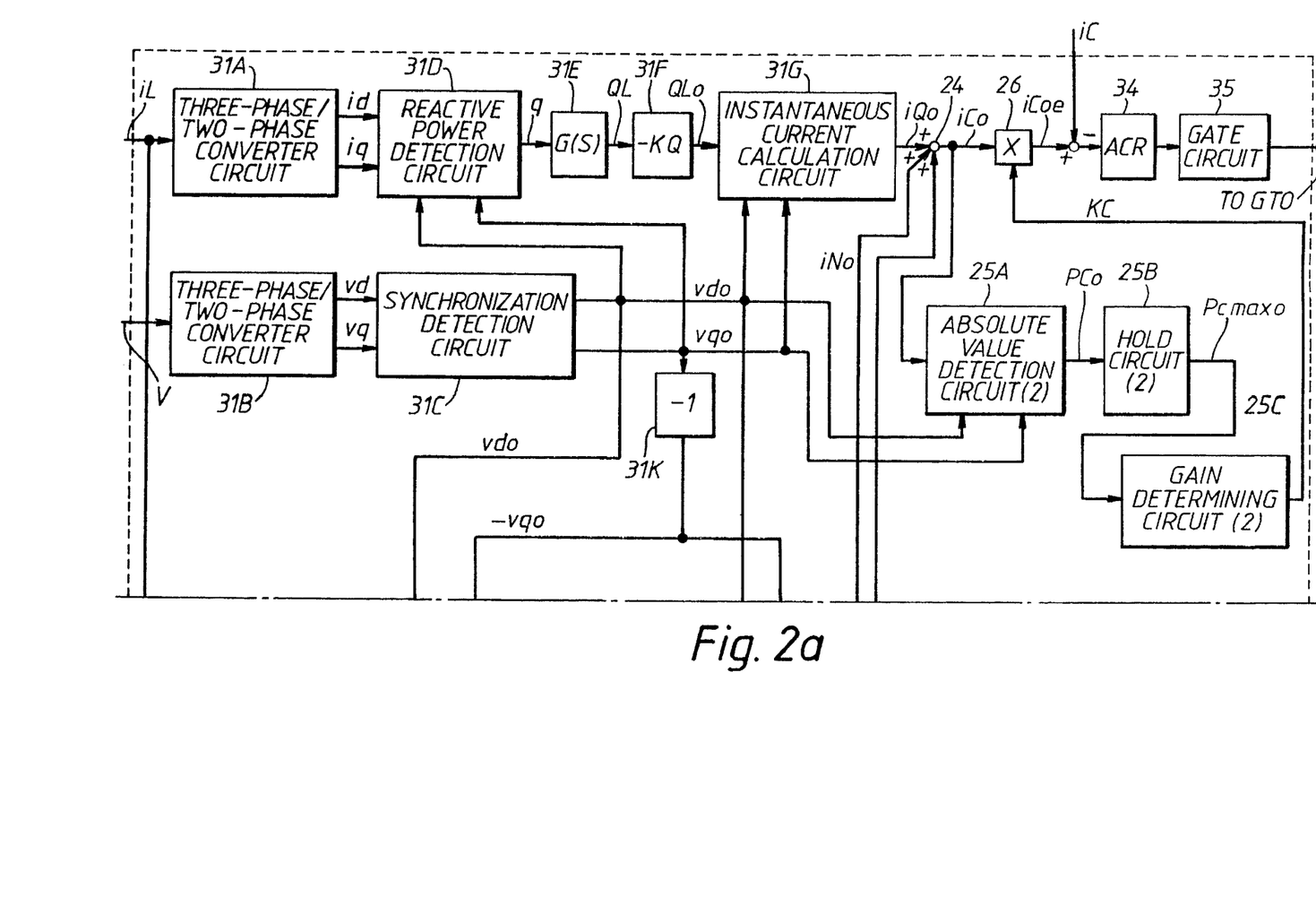
FIGS. 2a and 2b are circuit diagrams showing a first embodiment of this invention.
Figure 2B:
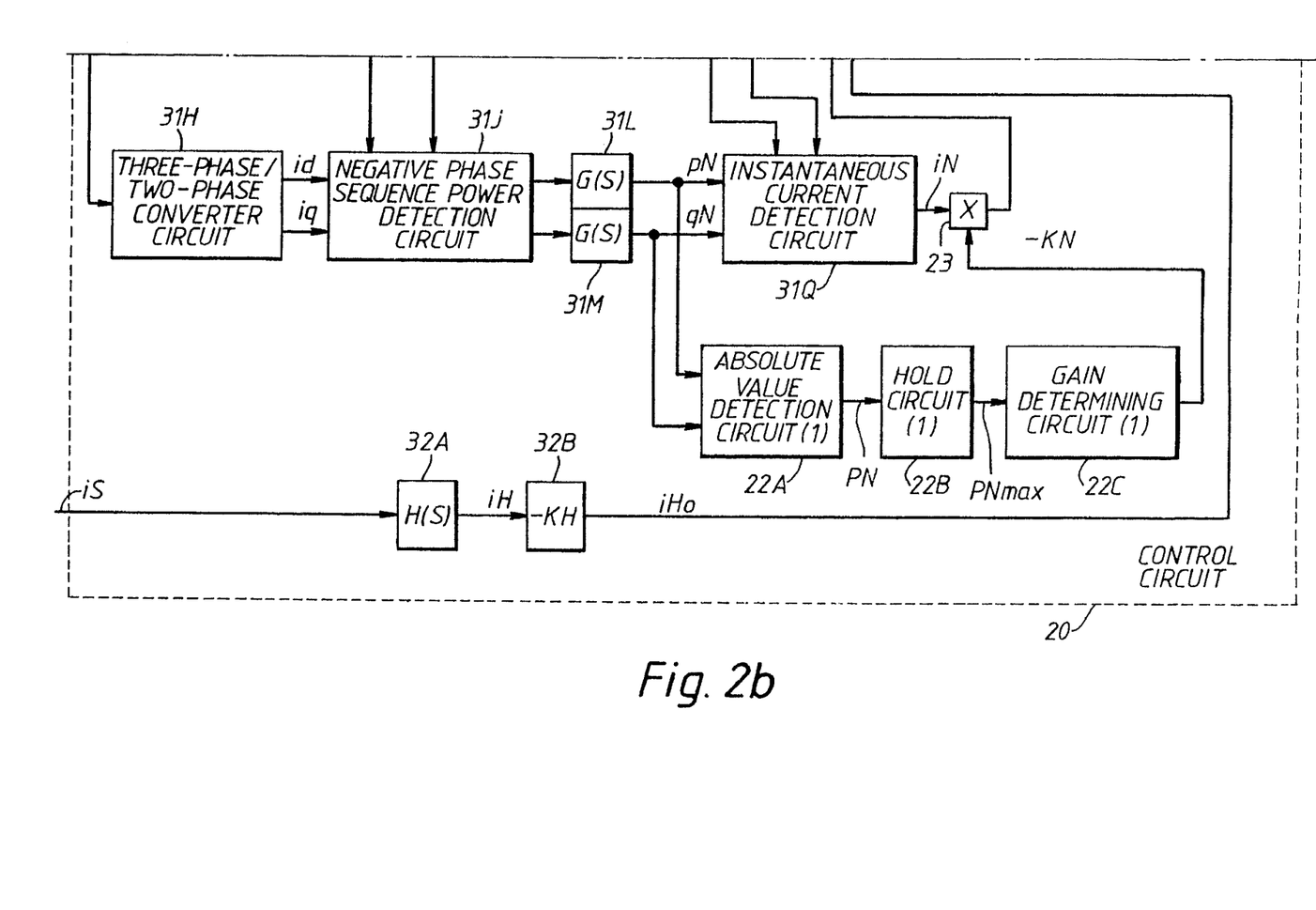

Next, a specific example of the embodiment of FIG. 1 will be described. FIG. 2 is a circuit diagram showing a specific example of a first embodiment of this invention. The system layout (main circuit) is the same as that of FIG. 6, which shows the prior art, so further description of it is omitted, and explanation thereof is also omitted. In the case of control circuit 20 also, parts which are the same as parts in FIG. 6 are given the same reference numerals and an explanation of them is omitted.

Figure 6A:
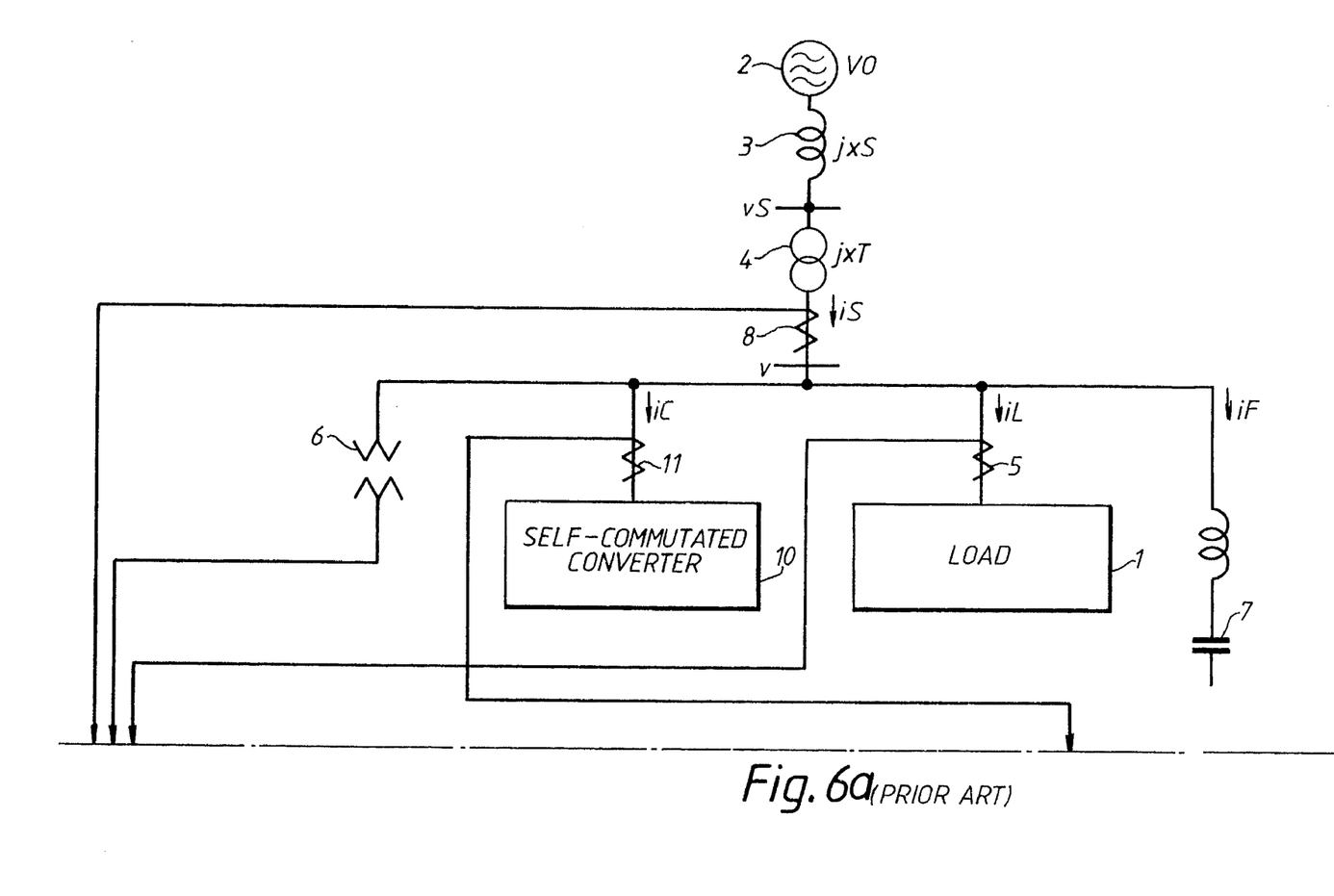
FIGS. 6a and 6b are circuit diagrams showing a specific example of the prior art voltage fluctuation and higher harmonics suppression device of FIG. 4.
Figure 6B:
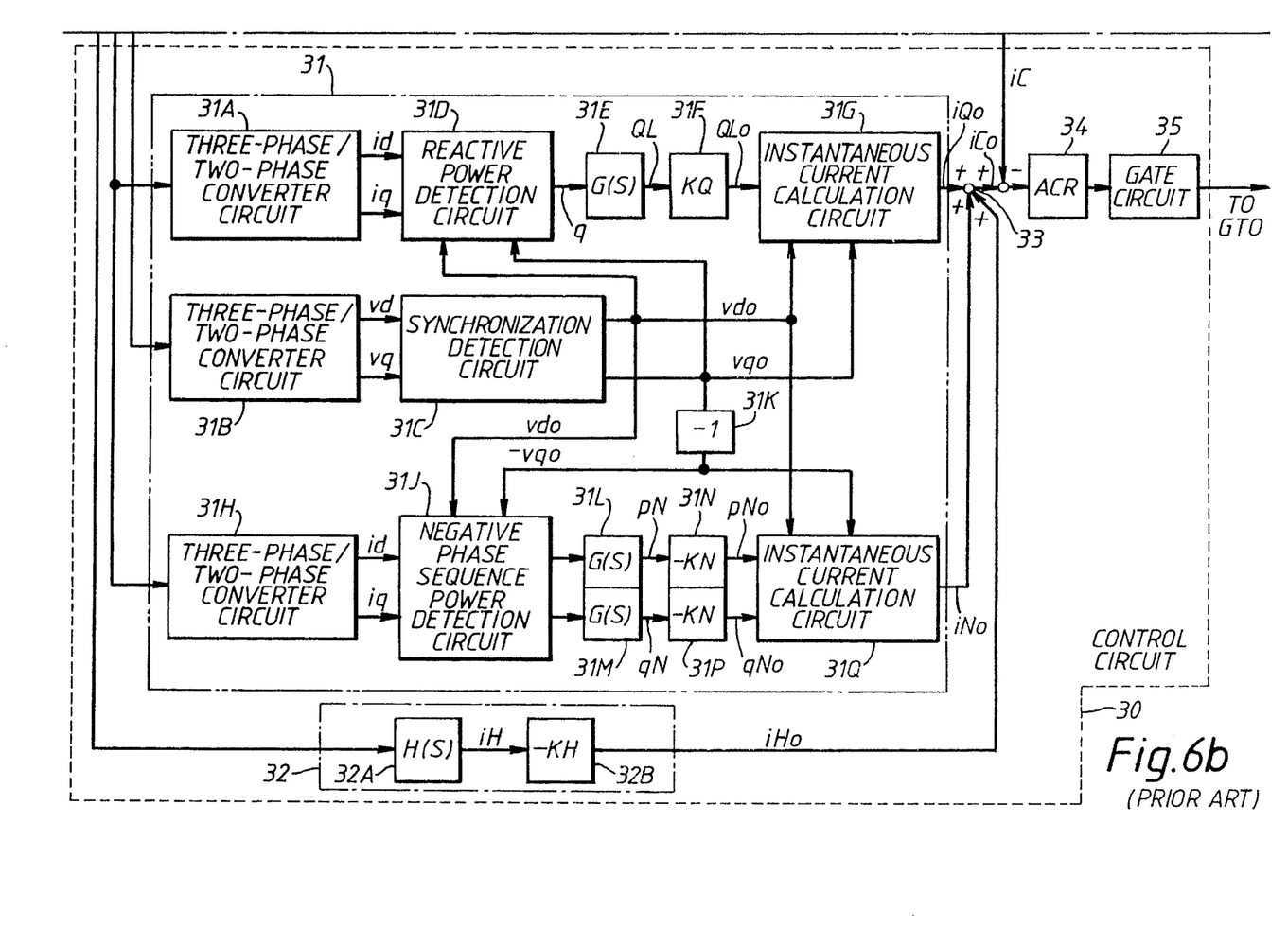

In this embodiment, coefficient circuits 31N, 31P in the prior art control circuit 30 shown in FIG. 6 are dispensed with, and the following construction is added. Specifically, outputs pN, qN of filters 31L, 31M are input to an absolute value detection circuit (1) 22A for the negative phase sequence power; output PN of absolute value detection circuit 22A is input to a hold circuit (1) 22B; PNmax which is the output of hold circuit 22B is input to a gain determining circuit (1) 22C; gain (−KN) which is the output of gain determining circuit (1) 22C and the output of instantaneous current calculating circuit 31Q are multiplied by a multiplier circuit 23; and the result of the multiplication is input to adder circuit 24. Furthermore, overall current instruction value iCo which is the result of the addition performed by adder circuit 24 and outputs vdo, vqo of synchronization detection circuit 31C are input to an absolute value detection circuit (2) 25A; an output PCo of absolute value detection circuit 25A is input to a hold circuit (2) 25B; PCmaxo, which is the output of this hold circuit (2) 25B, is input to a gain determining circuit (2) 25C; gain KC which is the output of gain determining circuits 25C, and overall current instruction value iCo which is the result of the addition performed by adder circuit 24, are input to multiplier circuit 26; and the deviation between final current instruction value iCoe which is thereby obtained and current iC detected by current transformer 11 is input to automatic current signal regulator 34.

The detailed construction and the operation of the embodiment constructed as shown in FIG. 2 will now be explained. Current instruction value iQo for the reactive power and harmonic current instruction value iHo are found by the same technique as in the prior art control circuit 30. Fundamental wave negative phase sequence powers pN, qN, are respectively detected by filters 31L, 31M as in the case of the prior art control circuit 30. Instantaneous current calculation circuit 31Q receives voltage signals vdo, (−vqo) and fundamental wave negative phase sequence powers pN, qN, and converts them to a negative phase sequence current instruction value iN, by the same technique as in the prior art control circuit 30 except that powers pNo, qNo are substituted by powers pN, qN, respectively.

In this embodiment, absolute value PN of the negative phase sequence power is found by absolute value detection circuit 22A using equation (6);

$$PN=(pN^2+qN^2)^{1/2} \qquad (6)$$

Here, absolute value PN of the negative phase sequence power varies with time with fluctuation in load 1, so hold circuit 22B holds its maximum value PNmax for a fixed time (on the order of several tens of ms to one second). Gain determining circuit 22C then determines compensation gain KN for negative phase sequence current instruction value iNo of instantaneous current calculation circuit 31Q in accordance with maximum value PNmax. Here, KN is determined such that if PNmax is small, KN=1, while, if PNmax gets large, KN is in inverse proportion to PNmax. Such a characteristic can be implemented by referring to function tables using a microcomputer in gain determining circuit 22C. Negative phase sequence current instruction value iNo is calculated in multiplier circuit 23 by multiplying compensation gain KN of the negative phase sequence current found as above by negative phase sequence current detection value iN.

Adder circuit 24 finds overall current instruction value iCo by adding current instruction value iQo for the reactive power, harmonic current instruction value iHo, and negative phase sequence current instruction value iNo. Next, final current instruction value iCoe is determined such that the rated current of self-commutated converter 10 is not exceeded. This is implemented by the following technique. First of all, absolute value PCo of overall current instruction value iCo is found by absolute value detection circuit 25A, which receives signals vdo, vqo and instruction value iCo. In this calculation, the instantaneous real and imaginary powers pCo, qCo are calculated by substituting three phase components of overall current instruction value iCo into equation (1) and equation (3). Absolute value PCo is then found in equation (6) by substituting pCo and qCo in place of pN and qN, respectively.

Absolute value PC of overall current instruction value iCo also varies with time with fluctuation in load 1, so hold circuit 25B holds its maximum value PCmax for a fixed time (on the order of several tens of ms to one second). Gain determining circuit ZSC calculates overall compensation gain KC based on maximum value PCmaxo held for a fixed time by hold circuit 25B. This technique is the same for gain determining circuit 22C as described above. Final current instruction value iCoe is found by multiplying overall current instruction value iCo and overall compensation gain KC in multiplier 26. Automatic current signal regulator (ACR) 34 controls gate circuit 35 such that output current iC of self-commutated converter 10 coincides with final current instruction value iCoe.

The first embodiment described above has the following benefits due to its action as described above.

(1) Since the compensation gain is made variable in response to the amount of occurrence of negative phase sequence current, even when the negative phase sequence current gets too large, there is no possibility of the function of reactive power compensation or the function of harmonic compensation being lost.

(2) Since final current instruction value iCoe is found such that the rated current of the self-commutated converter 10 is not exceeded, there is no possibility of the compensation function being lost even if there are excessively large load fluctuations.

Figure 3A:
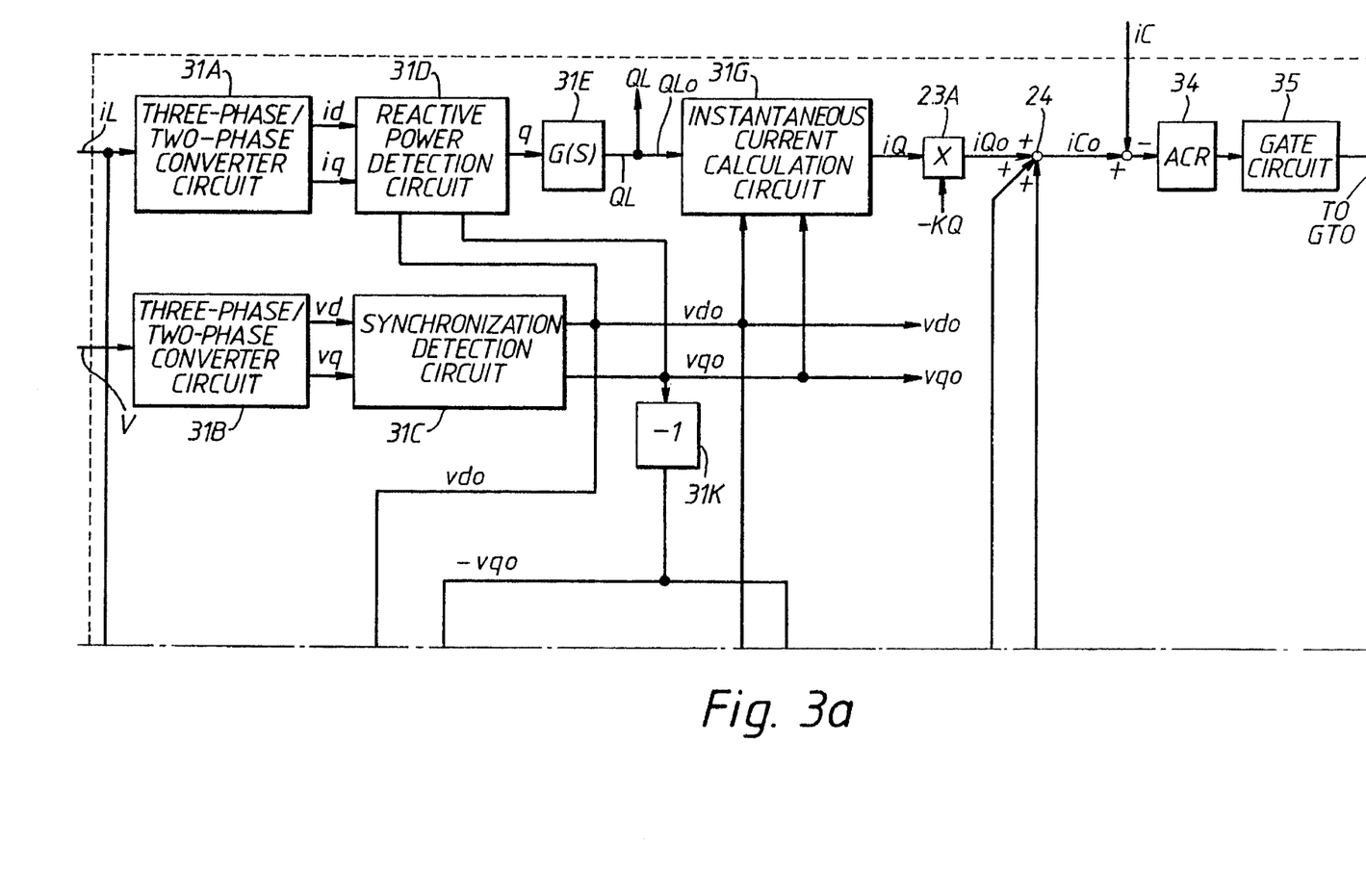
FIGS. 3a and 3b are circuit diagrams showing a second embodiment of this invention.
Figure 3B:
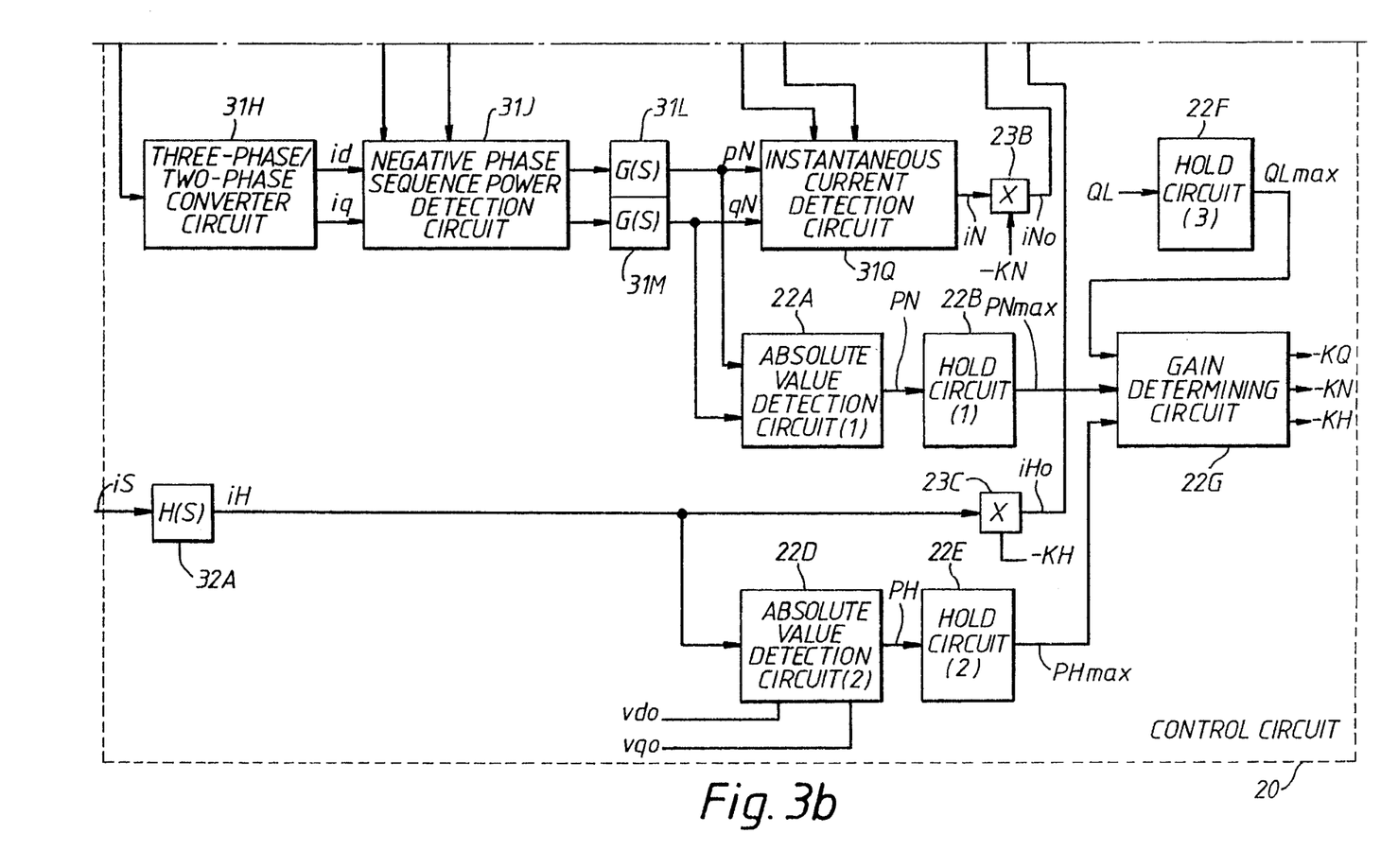

Next, a second embodiment of this invention will be described with reference to FIG. 3. Parts that are the same as in FIG. 2 are given the same reference numerals and a description thereof is omitted. Only the points of difference are described below.

Absolute value detection circuit (2) 22D is a means that calculates an absolute value PH of harmonic current iH, and hold circuit (2) 22E is a means that holds a maximum value PHmax of this for a fixed time. Absolute value detection circuit (2) 22D receives harmonic current iH from filter 32A and synchronous voltage signals vdo, vqo from synchronous detection circuit 31C and outputs absolute value PH of harmonic current iH. Hold circuit (2) 22E receives absolute value PH and outputs maximum value PHmax. Circuit 22D, 22E have identical constructions with absolute value detection circuit (2) 25A and hold circuit (2) 25B in FIG. 2, respectively. Hold circuit (3) 22F is identical in its construction with hold circuit (1) 22B and is the means that holds for a fixed time maximum value QLmax of reactive power detection value QL from filter 31E. Instantaneous current calculation circuit 31G receives reactive power detection value QL from filter 31E and voltage signals vdo, vqo and converts them to a current instruction value iQ as in the prior art control circuit 30 except that QLo and iQo are substituted by QL and iQ, respectively. Gain determining circuit 22G is a means for determining compensation gains KQ, KN, and KH for respective current instruction values iQo, iNo and iHo in accordance with reactive power component maximum value QLmax, negative phase sequence component maximum value PNmax, and harmonic component maximum value PHmax. It is constituted, for example, by the following procedures. Here, The rated capacity of self-commutated converter 10 is assumed to be PC, and, for the purposes of explanation, it is assumed That QLmax>PHmax>PNmax.

(1) Under the condition that the compensation gain i.e. KQ of the largest one of QLmax, PNmax and PHmax is less than 1 and KQ·QLmax≦PC, the value closest to 1 is selected for compensation gain KQ.

(2) Under the conditions that the compensation gain i.e. KH of the second largest of QLmax, PNmax and PHmax is less than 1 and (KQ·QLmax+KH—PHmax)≦PC, the value closest to 1 is selected for compensation gain KH.

(3) Under the condition that the compensation gain i.e. KN of the smallest of QLmax, PNmax and PHmax is less than 1 and (KQ·QLmax+KH·PHmax+KN·PNmax)≦PC, the value closest to 1 is selected for compensation gain KN.

Current instruct/on values iQo, iNo and iHo for each component are found in multipliers 23A, 23B and 23C by multiplying compensation gains KQ, KN and KH of each component found by the above procedures by the respective detected amounts iQ, iN and iH. The value obtained by combining current instruction values iQo, iNo and iHo in adder circuit 24 is overall instruction value iCo of self-commutated converter 10.

Automatic current signal regulator (ACR) 34 controls gate circuit 35 such that output current iC of self-commutated converter 10 coincides with overall current instruction value iCo.

It should be noted that the target gain of gain determining circuit 22G need not necessarily be 1, but could have different values for each component.

The following benefits are obtained with this second embodiment.

(1) Of the plurality of components to be compensated, the one with the largest amount of occurrence can be effectively compensated, and the other components can be compensated with the remainder of the capacity (marginal capacity) of the device.

(2) The current instruction values can be found such that the rated current of the self-commutated converter is not exceeded, so the compensation function is never lost even for excessively large load fluctuations.

In the embodiment of this invention shown in FIG. 2, compensation gain KN for negative phase sequence current component is only calculated in gain determining circuit 22C. And as other compensation gains KQ and KH, fixed values are used respectively.

But this invention is not limited to this embodiment. According to another embodiment of this invention, compensation gain KQ for reactive power component and compensation gain KN for negative phase sequence current component may be calculated based on compensation current variables such as reactive power QL, instantaneous real and imaginary powers pN and qN of a fundamental wave negative phase sequence power. And as only compensation gain KH a fixed value is used.

Moreover, in a specific case, another embodiment of this invention may be used, wherein as compensation gains KQ, KN and KH, fixed gains are used, respectively, and wherein gain determining means (2) 25 and instruction value compensation means 26 in FIG. 1 are provided in control circuit 20.

According to this invention as described above, a voltage fluctuation and higher harmonics suppression device can be provided wherein the device capacity can be effectively utilized to the maximum and economy thereby improved irrespective of the magnitude of the load fluctuations, and wherein the voltage fluctuation and higher harmonics suppression effect can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A device for suppressing voltage fluctuation and higher harmonics of a power source system which supplies power to a load with large power fluctuation and large harmonic current, said device comprising:

a self-commutated converter arranged in parallel with said load; and a control circuit for controlling said self-commutated converter;

said control circuit comprising:

compensation current variable calculation means for calculating a plurality of compensation current variables based on electrical quantities of said power source system and said load;

compensation gain calculation means for determining at least one compensation gain based on said at least one compensation current variable;

current instruction value calculation means for calculating a plurality of respective current instruction values based on said compensation gain and a plurality of said respective current compensation variables;

overall current instruction value calculation means for calculating an overall current instruction value by combining said plurality of current instruction values;

current control means for controlling an output current of said self-commutated converter based on said overall current instruction value;

overall compensation gain calculation means for determining an overall compensation gain based on said overall current instruction value; and final current instruction value calculation means for calculating a final current instruction value by multiplying said overall current instruction value and said overall compensation gain;

said overall compensation gain being determined such that said final current instruction value does not exceed a rated current value of said self-commutated converter;

whereby said current control means controls said output current of said self-commutated converter based on said final current instruction value in place of said overall current instruction value;

said compensation current variable calculation means calculating said plurality of compensation current variables including compensation current variables for reactive power component for negative phase sequence current component and for harmonic current component based on a current and a voltage of said power source system and a load current; and said current instruction value calculation means calculating said plurality of respective current instruction values including current instruction values for reactive power component for negative phase sequence current component and for harmonic current component based on said compensation gain and said respective compensation current variables;

wherein in said compensation current variable calculation means, said compensation current variable for reactive power component includes a reactive power (QL) of said load, said compensation current variable for negative phase sequence current component includes an instantaneous real power (pN) and an instantaneous imaginary power (qN) of a fundamental wave negative phase sequence power, and said compensation current variable for harmonic current component includes a harmonic current (iH) of said power source system;

wherein, said compensation gain calculation means determines said compensation gain (KN) for said negative phase sequence current component based on said instantaneous real power (pN) and said instantaneous imaginary power (qN) of said fundamental wave negative phase sequence power; and wherein said current instruction value calculation means calculates said current instruction value (iQo) for reactive power component based on a fixed compensation gain (KQ) for said reactive power component and said reactive power of said load (QL), calculates said current instruction value (iNo) for negative phase sequence current component based on said compensation gain (KN) for said negative phase sequence current component and said instantaneous real power (pN) and said instantaneous imaginary power (qN) of said fundamental wave negative phase sequence power, and calculates said current instruction value (iHo) for harmonic current component based on a fixed compensation gain (KH) for said harmonic current component and said harmonic current (iH);

wherein said compensation gain calculation means includes:

a first absolute value detection circuit for detecting an absolute value (PN) of said negative phase sequence power based on said instantaneous real power (pN) and said instantaneous imaginary power (qN) of said fundamental wave negative phase sequence power to generate as a first absolute value;

a first hold circuit for holding a maximum value (PNmax) of said first absolute value for a first fixed time to generate as a first maximum value; and a first gain determining circuit for determining said compensation gain (KN) for said negative phase sequence current component based on said first maximum value.

2. The device for suppressing voltage fluctuation and higher harmonics according to claim 1, wherein:

said first gain determining circuit determines said compensation gain (KN) for said negative phase sequence current component such that when said first maximum value is smaller than a first predetermined value said compensation gain (KN) is 1, and when said first maximum value is not smaller than said first predetermined value said compensation gain (KN) is inverse proportional to said first maximum value.

3. The device for suppressing voltage fluctuation and higher harmonics according to claim 2, wherein said overall compensation gain calculation means includes:

a second absolute value detection circuit for detecting an absolute value (PCo) of said overall current instruction value (iCo) to generate as a second absolute value;

a second hold circuit for holding a maximum value (PCmaxo) of said second absolute value for a second fixed time to generate as a second maximum value; and a second gain determining circuit for determining said overall compensation gain (KC) based on said second maximum value.

4. The device for suppressing voltage fluctuation and higher harmonics according to claim 3, wherein:

said second gain determining circuit determines said overall compensation gain (KC) such that when said second maximum value is smaller than a second predetermined value said overall compensation gain (KC) is 1, and when said second maximum value is not smaller than said second predetermined value said overall compensation gain (KC) is inverse proportional to said second maximum value. fundamental wave negative phase sequence power to generate as a first absolute value;

a first hold circuit (22B) for holding a maximum value (PNmax) of said first absolute value for a first fixed time to generate as a first maximum value;

a second absolute value detection circuit (22D) for detecting an absolute value (PH) of said harmonic current current (iH) to generate as a second absolute value;

a second hold circuit (22E) for holding a maximum value (PHmax) of said second absolute value for a second fixed time to generate as a second maximum value;

a third hold circuit (22F) for holding a maximum value (QLmax) of said reactive power (QL) of said load for a third fixed time to generate as a third maximum value; and a gain determining circuit (22G) for determining said compensation gain (KQ) for said reactive power component, said compensation gain (KN) for said negative phase sequence current component, and said compensation gain (KH) for said harmonic current component, based on said first maximum value (PNmax), said second maximum value (PHmax), and said third maximum value (QLmax).

5. A device for suppressing voltage fluctuation and higher harmonics of a power source system which supplies power to a load with large power fluctuation and large harmonic current, said device comprising:

a self-commutated converter arranged in parallel with said load; and a control circuit for controlling said self-commutated converter;

said control circuit comprising:

compensation current variable calculation means for calculating a plurality of compensation current variables based on electrical quantities of said power source system and said load;

compensation gain calculation means for determining at least one compensation gain based on said at least one compensation current variable;

current instruction value calculation means for calculating a plurality of respective current instruction values based on said compensation gain and a plurality of said respective current compensation variables; and overall current instruction value calculation means for calculating an overall current instruction value by combining said plurality of current instruction values;

wherein said compensation current variable calculation means calculates said plurality of compensation current variables including compensation current variables for reactive power component for negative phase sequence current component and for harmonic current component based on a current and a voltage of said power source system and a load current; and said current instruction value calculation means calculates said plurality of respective current instruction values including current instruction values for reactive power component, for negative phase sequence current component and for harmonic current component based on said compensation gain and said respective compensation current variables;

wherein in said compensation current variable calculation means, said compensation current variable for reactive power component includes a reactive power (QL) of said load, said compensation current variable for negative phase sequence current component includes an instantaneous real power (pN) and an instantaneous imaginary power (qN) of a fundamental wave negative phase sequence power, and said compensation current variable for harmonic current component includes a harmonic current (iH) of said power source system;

wherein said compensation gain calculation means determines said compensation gain (KQ) for said reactive power component, said compensation gain (KN) for said negative phase sequence current component, and said compensation gain (KH) for said harmonic current component, based on said reactive power (QL) of said load, said instantaneous real power (pN) and said instantaneous imaginary power (qN) of said fundamental wave negative phase sequence power, and said harmonic current (iH) of said power source system; and wherein current instruction value calculation means calculates said current instruction value (iQo) for reactive power component based on said compensation gain (KQ) for reactive power component and said reactive power (QL) of said load, calculates said current instruction value (iNo) for negative phase sequence current component based on said compensation gain (KN) for said negative phase sequence current component and said instantaneous real power (pN) and said instantaneous imaginary power (qN) of said fundamental wave negative phase sequence power, and calculates said current instruction value (iHo) for harmonic current component based on said compensation gain (KH) for harmonic current component and said harmonic current (iH);

wherein, said compensation gain calculation means includes:

a first absolute value detection circuit for detecting an absolute value (PN) of said negative phase sequence power based on said instantaneous real power (pN) and said instantaneous imaginary power (qN) of said fundamental wave negative phase sequence power to generate as a first absolute value;

a first hold circuit for holding a maximum value (PNmax) of said first absolute value for a first fixed time to generate as a first maximum value;

a second absolute value detection circuit for detecting an absolute value (PH) of said harmonic current (iH) to generate as a second absolute value;

a second hold circuit for holding a maximum value (PHmax) of said second absolute value for a second fixed time to generate as a second maximum value;

a third hold circuit for holding a maximum value (QLmax) of said reactive power (QL) of said load for a third fixed time to generate as a third maximum value; and a gain determining circuit for determining said compensation gain (KQ) for said reactive power component, said compensation gain (KN) for said negative phase sequence current component, and said compensation gain (KH) for said harmonic current component, based on said first maximum value (PNmax), said second maximum value (PHmax), and said third maximum value (QLmax).

6. The device for suppressing voltage fluctuation and higher harmonics according to claim 5, wherein, said current instruction value calculation means includes:

an instantaneous current calculation circuit connected to receive said reactive power (QL) of said load for generating a detection value (iQ) for said reactive power component;

a multiplier circuit for generating said current instruction value (iQo) for said reactive power component by multiplying said detection value (iQ) for said reactive power component and said compensation gain (KQ) for said reactive power component;

an instantaneous current calculation circuit connected to receive said instantaneous real power (pN) and said instantaneous imaginary power (qN) of said fundamental wave negative phase sequence power for generating a detection value (iN) for said negative phase sequence current;

a multiplier circuit for generating said current instruction value (iNo) for said negative phase sequence current component by multiplying said detection value (iN) for said negative phase sequence current and said compensation gain (KN) for said negative phase sequence current component; and a multiplier circuit for generating said current instruction value (iHo) for said harmonic current component by multiplying said harmonic current (iH) and said compensation gain (KH) for harmonic current component.

* * * * *